(12) United States Patent
Sonoda et al.

(10) Patent No.: US 9,261,735 B2
(45) Date of Patent: Feb. 16, 2016

(54) LIQUID CRYSTAL DISPLAY DEVICE

(75) Inventors: Hidehiro Sonoda, Mobara (JP); Noboru Kunimatsu, Chiba (JP); Chikae Matsui, Mobara (JP); Takashi Yamamoto, Chiba (JP)

(73) Assignees: JAPAN DISPLAY INC., Tokyo (JP); Panasonic Liquid Crystal Display Co., Ltd., Hyogo (JP)

(*) Notice: Subject to any disclaimer, the term of this patent is extended or adjusted under 35 U.S.C. 154(b) by 0 days.

(21) Appl. No.: 13/242,419

(22) Filed: Sep. 23, 2011

(65) Prior Publication Data

US 2012/0075559 A1 Mar. 29, 2012

(30) Foreign Application Priority Data

Sep. 28, 2010 (JP) .................................. 2010-217063

(51) Int. Cl.
 *G02F 1/1339* (2006.01)
 *G02F 1/1337* (2006.01)
 *G02F 1/1335* (2006.01)

(52) U.S. Cl.
 CPC ........ *G02F 1/1339* (2013.01); *G02F 1/133788* (2013.01); *G02F 2001/133519* (2013.01)

(58) Field of Classification Search
 CPC .................................................. G02F 1/1339
 USPC ........................................................ 349/153
 See application file for complete search history.

(56) References Cited

U.S. PATENT DOCUMENTS

| | | | |
|---|---|---|---|
| 6,288,764 B1* | 9/2001 | Zhang et al. | 349/152 |
| 6,989,879 B1* | 1/2006 | Nakahara et al. | 349/123 |
| 2005/0271833 A1 | 12/2005 | Matsumori et al. | |
| 2006/0077334 A1* | 4/2006 | Kim et al. | 349/153 |
| 2007/0121050 A1* | 5/2007 | Toriyama et al. | 349/153 |
| 2008/0129946 A1* | 6/2008 | Chan et al. | 349/153 |
| 2010/0002182 A1* | 1/2010 | Lee et al. | 349/154 |
| 2010/0060836 A1* | 3/2010 | Kunimatsu et al. | 349/123 |
| 2010/0103358 A1* | 4/2010 | Gibbons et al. | 349/130 |
| 2010/0134745 A1* | 6/2010 | Lee et al. | 349/153 |
| 2012/0229743 A1* | 9/2012 | Sasaki | 349/123 |
| 2012/0242946 A1* | 9/2012 | Itoh | G02F 1/1339 349/153 |

FOREIGN PATENT DOCUMENTS

JP 2005-351924 12/2005

* cited by examiner

*Primary Examiner* — Edward Glick
*Assistant Examiner* — Alexander Gross
(74) *Attorney, Agent, or Firm* — Lowe Hauptman & Ham, LLP

(57) ABSTRACT

A liquid crystal display device includes a TFT substrate having a first alignment film formed on part of an inorganic insulating film, an overcoat film formed on a black matrix, a counter substrate having a second alignment film formed on the overcoat film, and a seal portion including a sealant. The TFT substrate is bonded to the counter substrate by the sealant. The sealant is bonded to the inorganic insulating film at the seal portion on the side where the TFT substrate is formed, with the first alignment film not being provided on the side, and, in the seal portion on the side where the counter substrate is formed, the sealant is bonded to the second alignment film but, is not bonded to the overcoat film.

4 Claims, 11 Drawing Sheets

FIG. 7

| | CONTENT | PCT DURABILITY | MECHANICAL STRENGTH | JUDGMENT |
|---|---|---|---|---|
| COMP. EXAMPLE 1 | ALIGNMENT FILM IS FORMED INSIDE A SEAL IN A LIQUID CRYSTAL DISPLAY DEVICE | 10h | 2.5G OK | × |
| COMP. EXAMPLE 2 | ALIGNMENT FILM IS FORMED OVER THE ENTIRE SURFACE OF A SUBSTRATE OF A LIQUID CRYSTAL DISPLAY DEVICE | 50h | 1.5G NG | × |
| EXAMPLE 1 | ALIGNMENT FILM OVERLAPS SEAL ONLY ON THE CF SIDE | 50h | 2.0G OK | ○ |
| EXAMPLE 2 | ALIGNMENT FILM IS NOT FORMED JUST BELOW THE SEAL PORTION BUT FORMED IN OTHER PORTION | 50h | 2.5G OK | ○ |
| EXAMPLE 3 | SEAL AND ALIGNMENT FILM OVERLAP PARTIALLY ONLY ON THE CF SIDE | 50h | 2.5G OK | ○ |

LIQUID CRYSTAL DISPLAY DEVICE

CLAIM OF PRIORITY

The present application claims priority from Japanese Patent Application JP 2010-217063 filed on Sep. 28, 2010, the content of which is hereby incorporated by reference into this application.

BACKGROUND OF THE INVENTION

1. Field of the Invention

The present invention relates to a display device. The invention particularly relates to an IPS liquid crystal display device in which the reliability of a seal portion is improved.

2. Description of the Related Art

A liquid crystal display device includes a TFT substrate having pixel electrodes, thin film transistors (TFT), or the like formed thereon in a matrix form, and a counter electrode opposing the TFT substrate and having color filters, or the like formed at positions corresponding to the pixel electrodes of the TFT substrate. Liquid crystal is put between the TFT substrate and the counter substrate. The liquid crystal display device controls light transmittance for each pixel by using liquid crystal molecules to form images.

Since the liquid crystal display devices are flat and light in weight, their application has been generalized in various fields including large-sized display devices such as television sets, mobile phones, DSCs (Digital Still Cameras), or the like. In contrast, the liquid crystal display devices involve a problem in terms of viewing angle characteristics. The viewing angle characteristics are a phenomenon that the brightness or chromaticity changes between when a screen is observed from the front and when the screen is observed in the oblique direction. The IPS (In Plane Switching) mode of operating liquid crystal molecules by a horizontal electric field has satisfactory viewing angle characteristics.

In the IPS mode, preferred characteristics are obtained when a pre-tilt angle is not formed with respect to liquid crystal molecules near an alignment film. Accordingly, it is advantageous to form the axis of orientation for the alignment film not by a rubbing method but by an optical alignment method. The optical alignment method also has an advantage over the rubbing method in that static electricity is not generated.

In optical alignment method, a polarized UV light is radiated to an alignment film, and thereby, such anisotropy that liquid crystal molecules are aligned in a predetermined direction, is provided to the alignment film. JP-A-2005-351924 describes a technique relating to such optical alignment.

SUMMARY OF THE INVENTION

Optical alignment is performed by radiating ultraviolet light polarized in a predetermined direction to an alignment film formed of a polymer. For example, when a polarized UV light is radiated to a polymer formed in a network shape, polymer formed in a predetermined direction relative to the direction in which the ultraviolet light is polarized, is destroyed. Then, anisotropy is formed in the alignment film for aligning liquid crystal molecules. No problem occurs so long as the polarized ultraviolet light for optical alignment is radiated only to the alignment film. However, if the ultraviolet light is radiated to a portion other than the alignment film, the radiated portion is deteriorated by the ultraviolet light to result in a problem. Such a problem is particularly significant when the material radiated by the ultraviolet light is an organic material.

FIG. 8 is a cross sectional view of a seal portion that is included in a liquid crystal display panel having a conventional structure, which shows a problem occurring when optical alignment is performed on an alignment film 113. The configuration shown in FIG. 8 is hereinafter referred to as Comparative Example 1. In FIG. 8, a liquid crystal layer 300 is put between a TFT substrate 100 formed with TFTs, etc. and a counter substrate 200 formed with a color filter 201, etc., and the liquid crystal layer 300 is sealed by a sealant 150. In the seal portion, a gate insulating film 102, an inorganic passivation film 106, and an interlayer insulating film 109 are formed above the TFT substrate 100. A detailed cross sectional structure is to be described later. A black matrix 202 and an overcoat film 203 are formed above the counter substrate 200. The sealant 150 is formed between the interlayer insulating film 109 of the TFT substrate 100 and the overcoat film 203. The alignment film 113 for aligning liquid crystals is not formed at a portion of the sealant 150.

FIG. 9 is a schematic view when optical alignment is performed on the alignment film 113 of the counter substrate 200. In FIG. 9, optical alignment is performed on the alignment film 113 by radiating a polarized UV light to the counter substrate 200 formed with the alignment film 113. Since the alignment film 113 is not formed at the seal portion, the ultraviolet light is radiated directly to the overcoat film 203. Then, the overcoat film 203 is deteriorated by the ultraviolet light to form a deteriorated portion 2031 of the overcoat film on the surface of the overcoat film 203. The deteriorated portion 2031 of the overcoat film tends to allow moisture to permeate therethrough.

In contrast, on the side where the TFT substrate 100 is formed, while the interlayer insulation film 109 is exposed at a portion where the alignment film 113 is not formed, the interlayer insulating film 109 is formed of SiN and not deteriorated by the ultraviolet light. Accordingly, even when optical alignment is performed by the ultraviolet light, problem as shown in FIG. 9 does not occur on the side of the TFT substrate 100.

When a liquid crystal panel is formed by using the thus formed counter substrate 200 and TFT substrate 100, the deteriorated portion 2031 of the overcoat film is present in the seal portion of the counter substrate 200 as show in FIG. 8. Therefore, moisture permeates through the portion to thereby deteriorate the life characteristic of the liquid crystal display panel. As a specific problem, moisture that has intruded into the liquid crystal display panel may swell to cause peeling of the seal portion.

FIG. 10 shows an example in which an alignment film 113 is formed on each of the TFT substrate 100 and the counter substrate 200 as far as the seal portion so that the deteriorated portion 2031 of the overcoat film on the side of the counter substrate 200 is not formed as shown in FIG. 8. The configuration shown in FIG. 10 is hereinafter also referred to as Comparative Example 2. When optical alignment is performed on the side of the counter substrate 200 as shown in FIG. 10, since the alignment film 113 is formed as far as the seal portion, the overcoat film 203 is not deteriorated by the ultraviolet light.

However, the configuration shown in FIG. 10 results in a problem of adhesion between the alignment film 113 and the interlayer insulating film 109 on the side of the TFT substrate 100 as shown in FIG. 11. The liquid crystal display panel undergoes various vibrations and impact shocks during use.

Accordingly, when the adhesion between each of the films is weak, inter-film peeling occurs when vibrations, or the like are exerted.

In FIG. 10 or FIG. 11, the alignment film 113 is an organic film formed of polyimide, etc. and the interlayer insulating film 109 is an inorganic film formed of SiN, etc. Generally, adhesion between an organic film and an inorganic film is weak. In contrast, since the sealant 150 is an adhesive material, adhesion between the sealant 150 and the alignment film 113 is strong. Further, on the side of the counter substrate 200, both of the overcoat film 203 and the alignment film 113 are organic films. Adhesion between the organic films is also strong.

When vibrations, or the like are exerted on the liquid crystal display panel having such a configuration, the stress is caused in the seal portion. Thus, peeling occurs between the alignment film 113 and the interlayer insulating film 109 in the seal portion on the side of the TFT substrate 100. This is because the alignment film 113 is an organic film and the interlayer insulating film 109 is an inorganic film formed of SiN, etc., and adhesion between them is weak.

As described above, it is not easy to attain compatibility between the arrangement for moisture penetration prevention and the arrangement for withstanding vibrations and impact shocks. The present invention intends to attain a liquid crystal display panel capable of preventing moisture from penetrating and having sufficient mechanical margin also for vibrations, etc.

The present invention intends to solve the problems describe above and has a specific constitution as described below.

(1) A liquid crystal display panel includes: a TFT substrate having a first alignment film formed on part of an inorganic insulating film; an overcoat film formed on a black matrix; a counter substrate having a second alignment film formed on the overcoat film; and a seal portion including a sealant; the TFT substrate being bonded to the counter substrate by the sealant, wherein the sealant is bonded to the inorganic insulating film at the seal portion on the side where the TFT substrate is formed, with the first alignment film being not provided on the side, and wherein, in the seal portion on the side where the counter substrate is formed, the sealant is bonded to the second alignment film but is not bonded to the overcoat film.

(2) A liquid crystal display panel includes: a TFT substrate having a first alignment film formed on part of an inorganic insulating film; an overcoat film formed on a black matrix; a counter substrate having a second alignment film formed on the overcoat film; and a seal portion including a sealant; the TFT substrate being bonded to the counter substrate by the sealant, wherein the sealant is bonded to the inorganic insulating film at the seal portion on the side where the TFT substrate is formed, with the first alignment film being not provided on the side, and wherein, in the seal portion on the side where the counter substrate is formed, the sealant is bonded to the second alignment film at part of the seal portion, the part of the seal portion being on the side of the end of the counter substrate with respect to the center of the seal portion, and the sealant at another part of the seal portion is bonded to the overcoat film.

As another means, in the seal portion on the side where the counter substrate is formed, the sealant is bonded to the second alignment film at first part of the seal portion, the first part of the seal portion being on the side of the end of the counter substrate with respect to the center of the seal portion, the sealant is bonded to the second alignment film at second part of the seal portion, the second part of the seal portion being on the center side of the counter substrate with respect to the center of the seal portion, and the sealant is bonded to the overcoat film at part other than the first part and the second part of the seal portion.

(3) A liquid crystal display panel includes: a TFT substrate having a first alignment film formed on part of an inorganic insulating film; an overcoat film formed on a black matrix; a counter substrate having a second alignment film formed on the overcoat film; and a seal portion including a sealant; the TFT substrate being bonded to the counter substrate by the sealant, wherein, in the seal portion on the side where the TFT substrate is formed, the sealant is bonded to the first alignment film at part of the seal portion, the part of the seal portion being on the side of the end of the TFT substrate with respect to the center of the seal portion, and the sealant at another part of the seal portion is bonded to the inorganic insulating film, and wherein, in the seal portion on the side where the counter substrate is formed, the sealant is bonded to the second alignment film at part of the seal portion, the part of the seal portion being on the side of the end of the counter substrate with respect to the center of the seal portion, and the sealant at another part of the seal portion is bonded to the overcoat film. That is, in the third means, the pattern of the first alignment film on the side of the TFT substrate is identical with the pattern of the second alignment film.

According to the first means of the invention, when optical alignment is performed using ultraviolet light, the ultraviolet light is not radiated directly to the overcoat film so that the overcoat film is not deteriorated, which can prevent intrusion of moisture from the deteriorated portion of the overcoat film.

According to the second means of the invention, in the seal portion on the side where the counter substrate is formed, the sealant is bonded to the alignment film at part of the seal portion, and the sealant at another part of the seal portion is bonded to the overcoat film. When optical alignment is performed, the overcoat film is deteriorated at the portion where the sealant is in direct contact with the overcoat film. However, since the moisture is blocked at a portion where the sealant is bonded to the alignment film, intrusion of the moisture can be prevented. In contrast, since a portion where the sealant is bonded to the overcoat film is also present, the bonding strength of the sealant can also be ensured sufficiently.

According to the third means of the invention, since, also on the side of the TFT substrate, a portion of the sealant is in contact with the alignment film and other portion thereof is in contact with the inorganic insulating film, prevention for the moisture intrusion and reliability for the seal portion can be attained simultaneously. At the same time, since an identical printing plate can be used for the counter substrate and the TFT substrate when the alignment film is printed, manufacturing cost of the liquid crystal display panel can be decreased.

BRIEF DESCRIPTION OF THE DRAWINGS

FIG. 7 is a table showing the effect of the present invention;

DETAILED DESCRIPTION OF THE EMBODIMENTS

Figure 1:
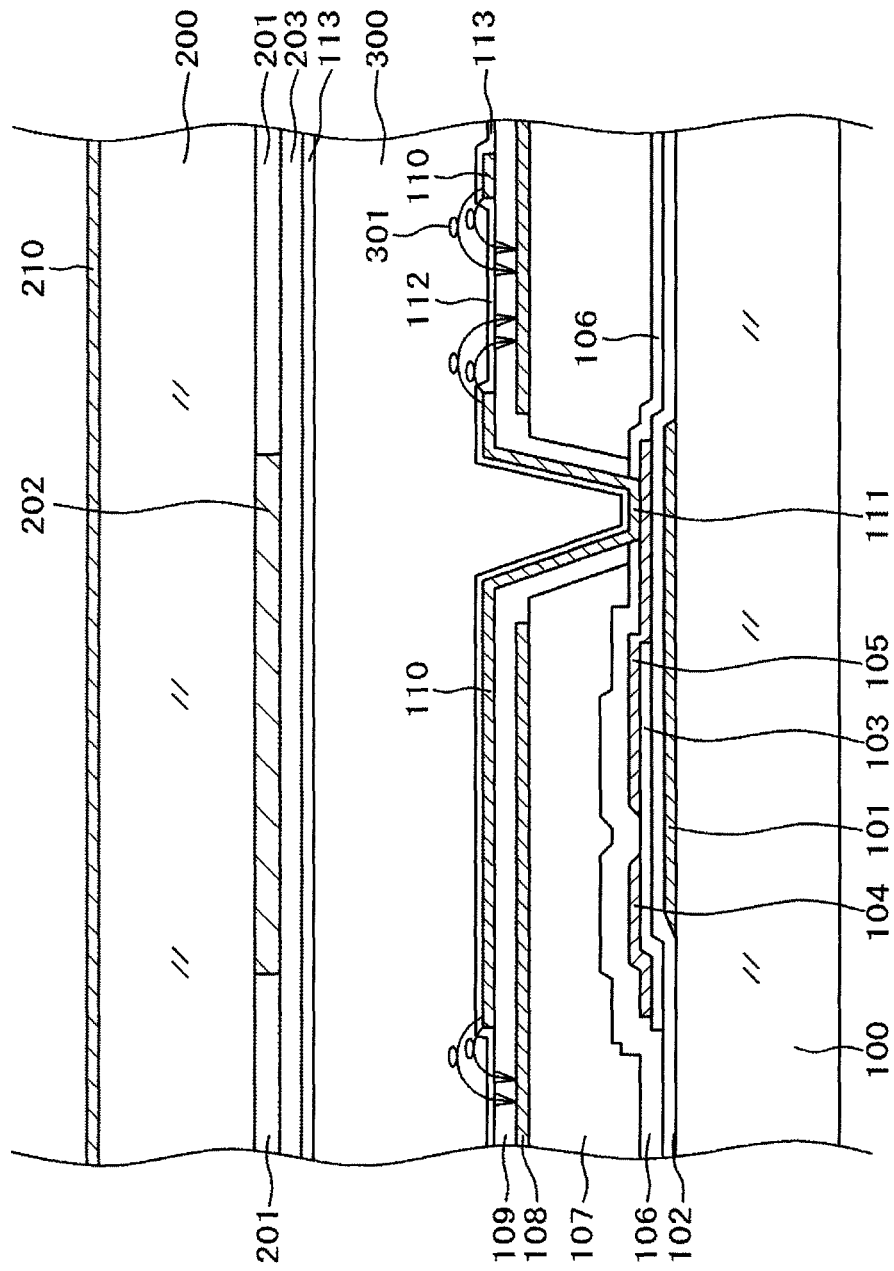
FIG. 1 is a cross sectional view for a display region of a liquid crystal display device.

Before examples of the invention are explained, a configuration of an IPS liquid crystal display panel to which the invention is applied is to be described. FIG. 1 is a cross sectional view showing a structure in a display region of the IPS liquid crystal display device. Various electrode structures have been proposed for the IPS liquid crystal display device and put to practical use. The structure in FIG. 1 is a structure used generally at present. To put it simply, a comb-shape pixel electrode 110 is formed above a counter electrode 108 formed in a planar solid pattern so that an insulating film is put between the comb-shape pixel electrode 110 and the counter electrode 108. Then, the light transmittance of a liquid crystal layer 300 is controlled for each pixel by rotation of liquid crystal molecules 301 by a voltage between the pixel electrode 110 and the counter electrode 108 so that images are formed.

The structure shown in FIG. 1 is to be described specifically. While the invention is to be described with reference to the configuration in FIG. 1 as an example, the invention is also applicable to IPS liquid crystal display devices other than that shown in FIG. 1.

In FIG. 1, a gate electrode 101 is formed on a TFT substrate 100 formed of glass. The gate electrode 101 is formed in a layer identical with that on which a scanning line is formed. The gate electrode 101 comprises an MoCr alloy laminated on an AlNd alloy.

A gate insulating film 102 is formed of SiN and covers the gate electrode 101. A semiconductor layer 103 is formed on the gate insulating film 102 so that the semiconductor layer 103 faces the gate electrode 101. The semiconductor layer 103 is formed of an a-Si film. The a-Si film is formed by plasma CVD. The a-Si film forms a channel of TFT, and a source electrode 104 and a drain electrode 105 are formed on the a-Si film putting the channel therebetween. A n+Si layer not illustrated is formed between the a-Si film and the source electrode 104 or the drain electrode 105. This is for establishing ohmic contact between the semiconductor layer and the source electrode 104 or the drain electrode 105.

The source electrode 104 also serves as a video signal line, and the drain electrode 105 is connected with a pixel electrode 110. Both the source electrode 104 and the drain electrode 105 are formed simultaneously in one identical layer. An inorganic passivation film 106 is formed of SiN and covers TFT. The inorganic passivation film 106 protects the TFT, particularly, the channel against impurity. An organic passivation film 107 is formed on the inorganic passivation film 106. Since the organic passivation film 107 also has a function of protecting the TFT and planarizing the surface of TFT, it is formed to have a large thickness. The thickness is from 1 μm to 4 μm. A through hole is formed in the organic passivation film.

A counter electrode 108 is formed on the organic passivation film 107. The counter electrode 108 is formed of ITO (Indium Tin Oxide) as a transparent conductive film. An interlayer insulating film 109 is formed of SiN and covers the counter electrode 108. A through hole 111 is formed by etching the interlayer insulating film 109 and the inorganic passivation film 106 in this step. Subsequently, ITO as the pixel electrode 110 is deposited covering the interlayer insulating film 109 and the through hole 111 and then patterned.

The pixel electrode 110 is a so-called comb-shape electrode. A slit 112 is formed between comb-shape electrodes adjacent to each other. A predetermined voltage is applied to the counter electrode 108, and a voltage due to video signals is applied to the pixel electrode 110. When the voltage is applied to the pixel electrode 110, a line of electric force is generated as shown in FIG. 1, and a liquid crystal molecule 301 is rotated in the direction of the line of electric force to control the transmission of light from a back light. Since the transmission of light from the back light is controlled for each pixel, and then, images are formed. An alignment film 113 on the side of the TFT substrate is formed on the pixel electrode 110 for aligning the liquid crystal molecule 301. Alignment to be performed on the alignment film 113 is optical alignment by a polarized UV light.

In the example of FIG. 1, a counter electrode 108 formed in a planar shape is disposed over the organic passivation film 107, and the comb-shape electrode 110 is disposed on the interlayer insulating film 109. In contrast, the pixel electrode 110 formed in a planar shape may sometimes be disposed on the organic passivation film 107 and the comb-shape counter electrode 108 may be disposed on the interlayer insulating film 109.

In FIG. 1, a counter substrate 200 is disposed with the liquid crystal layer 300 put between the counter substrate 200 and the TFT substrate. A color filter 201 is formed on the inside of the counter substrate 200. A black matrix 202 has a function of improving the contrast of the images and also acts as a light shielding film for the TFT to prevent photo-current from flowing to the TFT.

An overcoat film 203 is formed covering a color filter 201 and the black matrix 202. Since the surface of the color filter 201 and the black matrix 202 is uneven, the surface thereof is planarized by the overcoat film 203. An alignment film 113 for determining the initial alignment of the liquid crystal molecule 301 is formed on the overcoat film 203. The alignment film 113 is subjected to optical alignment.

An outer conductive film 210 is formed to the outside of the counter substrate 200 by the sputtering of ITO. The outer conductive film 210 is formed to stabilize the inner electric field of the liquid crystal display panel.

Example 1

Figure 2:
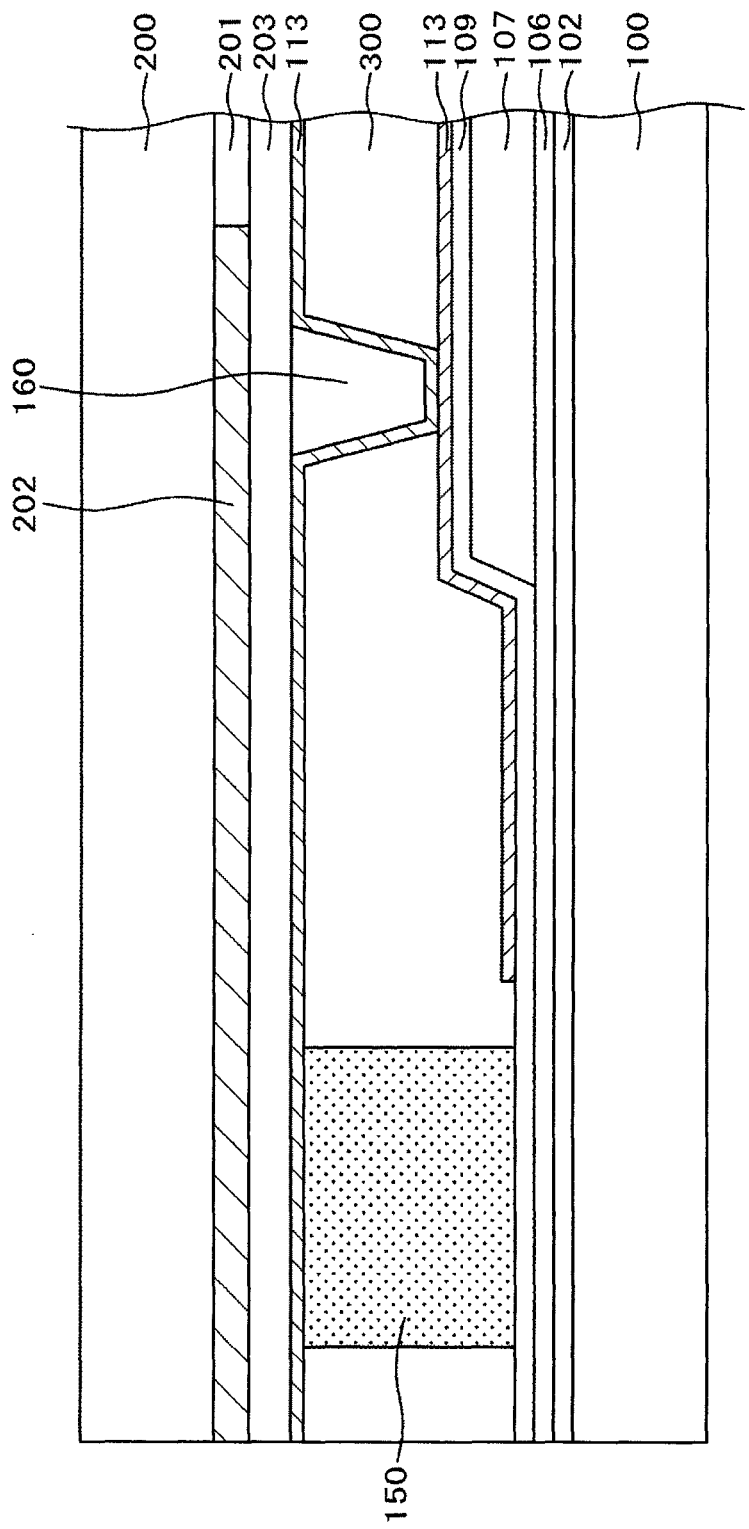
FIG. 2 is a cross sectional view for a seal portion of a liquid crystal display device according to Example 1.

FIG. 2 is a cross sectional view of a seal portion of the liquid crystal display panel in this example and this is a cross sectional view of the seal portion of the IPS liquid crystal display panel described with reference to FIG. 1. In FIG. 2, the external conductive film formed on the side of the counter substrate 200 is not illustrated.

In FIG. 2, a gate insulating film 102, an inorganic passivation film 106, an organic passivation film 107, an interlayer insulating film 109, and an alignment film 113 are stacked on a TFT substrate 100. The organic passivation film 107 is for planarizing the display region and not extended as far as the seal portion. The interlayer insulating film 109 formed on the organic passivation film 107 extends as far as the end of the TFT substrate 100. The alignment film 113 is formed covering the interlayer insulating film 109.

A color filter 201 and a black matrix 202 and an over coat film 203 are formed on the side where the counter substrate 200 in FIG. 2 is formed and the overcoat film 203 covers the color filter 201 and black matrix 202. A columnar spacer 160 defining the distance between the TFT substrate 100 and the counter substrate 200 is formed on the overcoat film 203. An alignment film 113 is formed covering the overcoat film 203 and the columnar spacer 160. The TFT substrate 100 and the counter substrate 200 are sealed by a sealant 150, and liquid crystals are filled in the inside of the liquid crystal display panel. For example, an epoxy resin is used for the sealant 150.

The alignment film 113 is subjected to optical alignment both on the side of the TFT substrate 100 and on the side of the counter substrate 200. This example has a feature that the alignment film 113 on the side of the counter substrate 200 is formed as far as the end of the counter substrate 200 but the alignment film 113 on the side of the TFT substrate is not formed as far as the portion below the sealant 150. In FIG. 2, when the alignment film 113 on the side of the counter substrate 200 is subjected to optical alignment by ultraviolet light, since the overcoat film 203 is entirely covered with the alignment film 113, the overcoat film 203 is not deteriorated. Accordingly, there is no problem that the moisture intrudes from the deteriorated portion of the overcoat film 203 to deteriorate the reliability of the liquid crystal display panel.

In contrast, on the side of the TFT substrate 100, while the alignment film 113 is formed in the display region, it is not formed as far as the seal portion. In this case, the interlayer insulating film 109 in the seal portion, which is not covered with the alignment film 113, undergoes the radiation of the ultraviolet light during optical alignment. However, since the interlayer insulating film 109 is formed of an inorganic film such as SiN, it is not deteriorated by the ultraviolet light.

According to the structure in FIG. 2, since no portions present both on the side of the TFT substrate 100 and on the side of the counter substrate 200 are deteriorated by the ultraviolet light upon optical alignment, intrusion of moisture from the seal portion can be prevented. Further, in the structure of FIG. 2, film peeling in the seal portion due to mechanical vibrations, or the like is not caused. That is, all of the insulating layers in the seal portion are inorganic films on the side of the TFT substrate 100 and bonding strength between each of them is strong. Further, on the side of the counter substrate 200, all of the layer structures in the seal portion are organic films and bonding strength between each of them is strong. Further, the sealant 150 is an adhesive material and has a strong bonding strength both with the alignment film 113 on the side of the counter substrate 200 and the SiN film on the side of the TFT substrate 100.

As described above, according to Example 1, intrusion of moisture due to the deterioration of the overcoat film 203 can be prevented and film peeling due to mechanical vibrations, or the like is not caused.

Example 2

Figure 3:
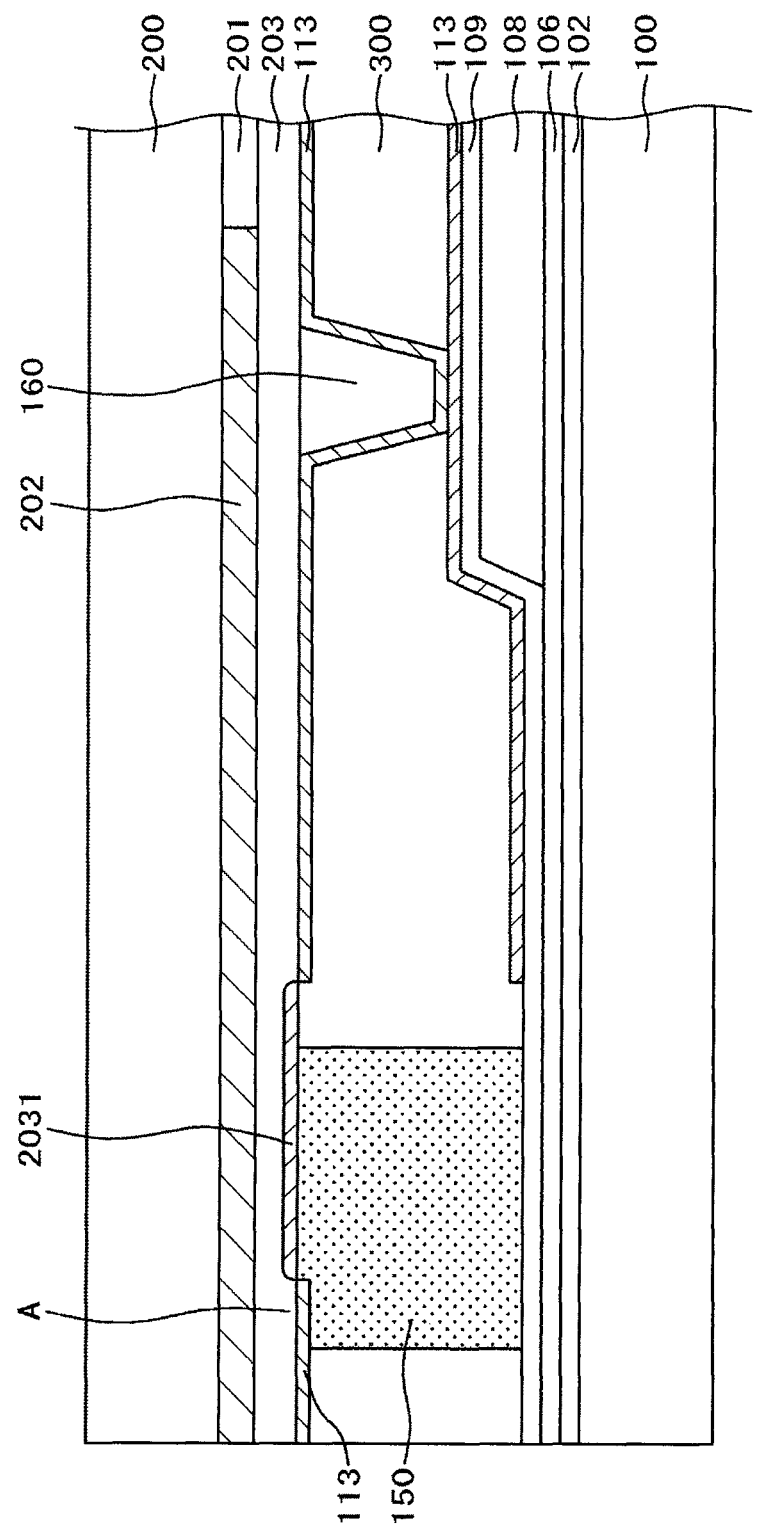
FIG. 3 is a cross sectional view for a seal portion according to a first embodiment of Example 2.

FIG. 3 is a cross sectional view showing a second example according to the invention. In FIG. 3, description for the structure identical with that in FIG. 2 is omitted. In the counter substrate 200 of FIG. 3, while the alignment film 113 is formed for the display region and at the end of the counter substrate 200, the alignment film 113 is not formed at the portion where the sealant 150 is formed except for the end of the counter substrate 200.

When optical alignment is performed on the counter substrate 200 as described above, the overcoat film 203 at the portion not covered with the alignment film 113 is deteriorated by the ultraviolet light. However, since a portion A where the alignment film 113 is formed overlapping the portion formed with the sealant 150 is present, deterioration of the overcoat film 203 is not caused in the portion A. Accordingly, since moisture from the outside is blocked at the portion A, the inside of the liquid crystal display panel is protected against intrusion of the moisture.

The bonding strength between the sealant 150 and the alignment film 113 is lower than the bonding strength between the sealant 150 and the overcoat film 203. In this example, since the sealant 150 and the overcoat film 203 are in contact over a wide range, the mechanical strength against vibrations, or the like is stronger compared with Example 1

Figure 4:
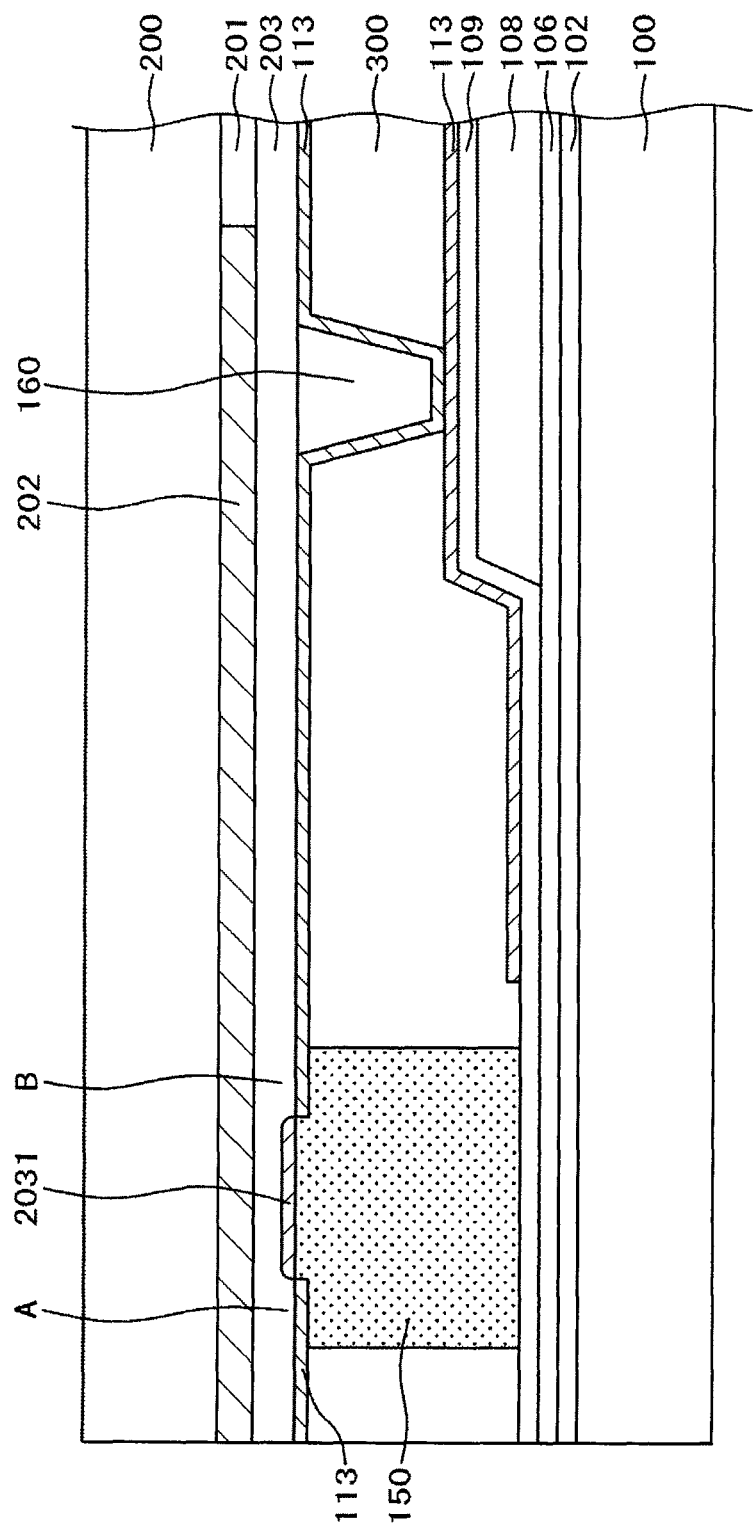
FIG. 4 is a cross sectional view for a seal portion according to a second embodiment of Example 2.

FIG. 4 is a cross sectional view showing another embodiment of Example 2. FIG. 4 is different from FIG. 3 in the structure in the seal portion of the counter substrate 200. In FIG. 4, the alignment film 113 overlaps the sealant 150 at the inside and the outside thereof. When the counter substrate 200 shown in FIG. 4 is subjected to optical alignment, the overcoat film 203 at a portion not covered with the alignment film 113 is deteriorated by the ultraviolet light.

However, since portions A and B where the sealant 150 overlaps the alignment film 113 are present at the inside and the outside of the sealant 150, the overcoat film 203 is not deteriorated at the portions A and B and intrusion of moisture from the outside can be prevented at the portions A and B. Further, at the portion where the alignment film 113 does not overlap the sealant 150, since the sealant 150 and the overcoat film 203 are in direct contact with each other, the bonding strength between the sealant 150 and the overcoat film 203 is strong.

As described above, also this embodiment can provide a liquid crystal display panel capable of preventing intrusion of the moisture from the outside and having high mechanical strength against vibrations, or the like. While this embodiment has higher blocking performance against intrusion of the moisture compared with the first embodiment, the strength against mechanical vibrations, or the like is inferior to that of the first embodiment. However, any of the embodiments is within a range of practical use.

Example 3

Figure 5:
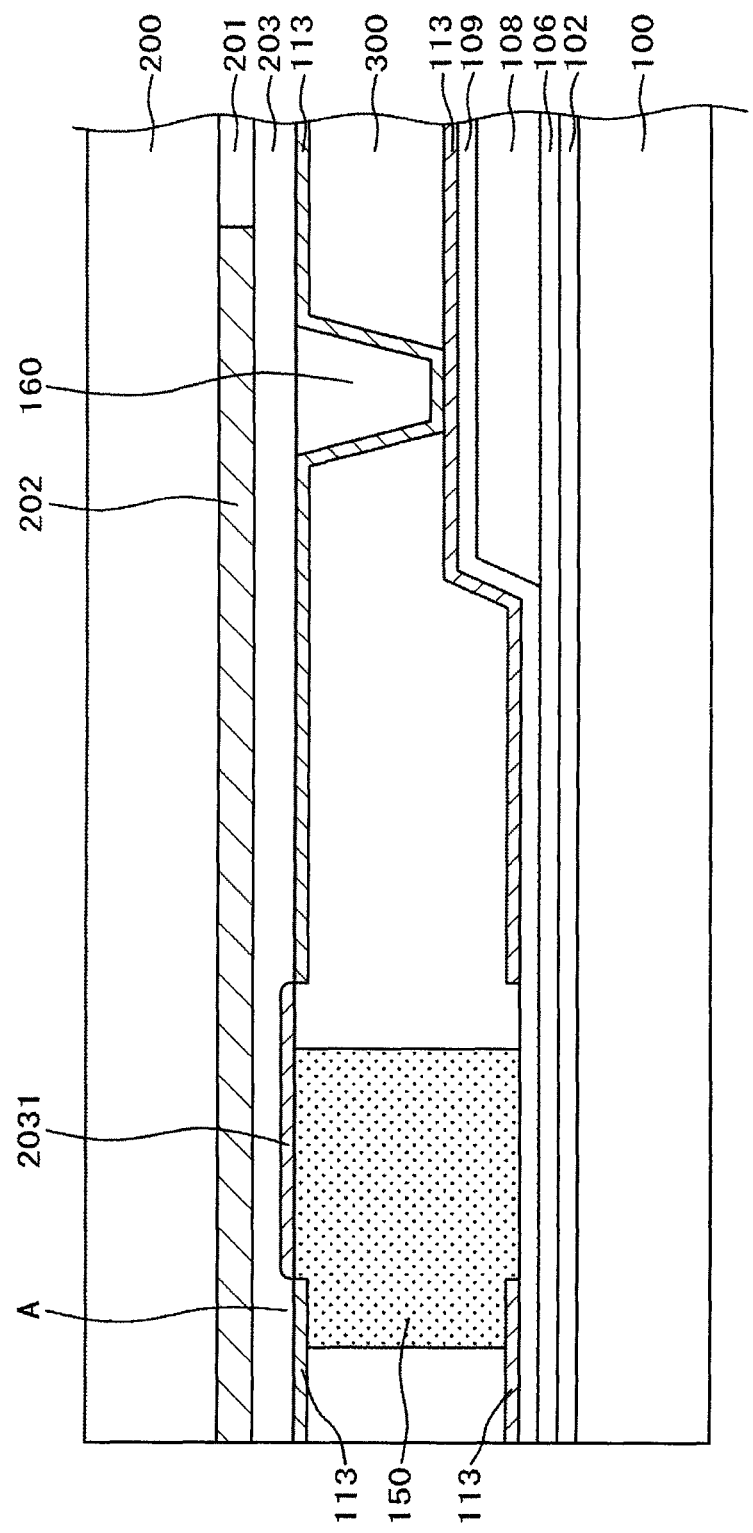
FIG. 5 is a cross sectional view for a seal portion according to a first embodiment of Example 3.

FIG. 5 is a cross sectional view showing a third example according to the invention. FIG. 5 is different from FIG. 3 in the structure of the TFT substrate 100 in the seal portion. In the TFT substrate 100 of FIG. 5, while the alignment films 113 is formed in the display region and at the end of the counter substrate 200, the alignment film 113 is not formed at the portion where the sealant 150 is formed except for the outer side. That is, in FIG. 5, the range over which the alignment film 113 extends on the side of the TFT substrate 100 is identical with that on the side of the counter substrate 200.

The alignment film 113 is generally formed by flexographic printing. When the range over which the alignment film 113 extends on the side of the counter substrate 200 is identical with that on the side of the TFT substrate 100, one printing plate will suffice. In contrast, in Example 1 and Example 2, two flexographic printing plates are necessary for the TFT substrate 100 and for the counter substrate 200. In this regard, this example is superior to Example 1 and Example 2 in mass productivity.

In FIG. 5, the function on the side of the counter substrate 200 is identical with that described in Example 2. On the side of the TFT substrate 100, a portion where the sealant 150 overlaps the alignment film 113 is present on the outer side of the TFT substrate 100. In contrast, the sealant 150 and the interlayer insulating film 109 formed of SiN are in direct contact with each other at other portion. Accordingly, the bonding strength between the sealant 150 and the TFT substrate 100 is also strong enough.

Figure 6:
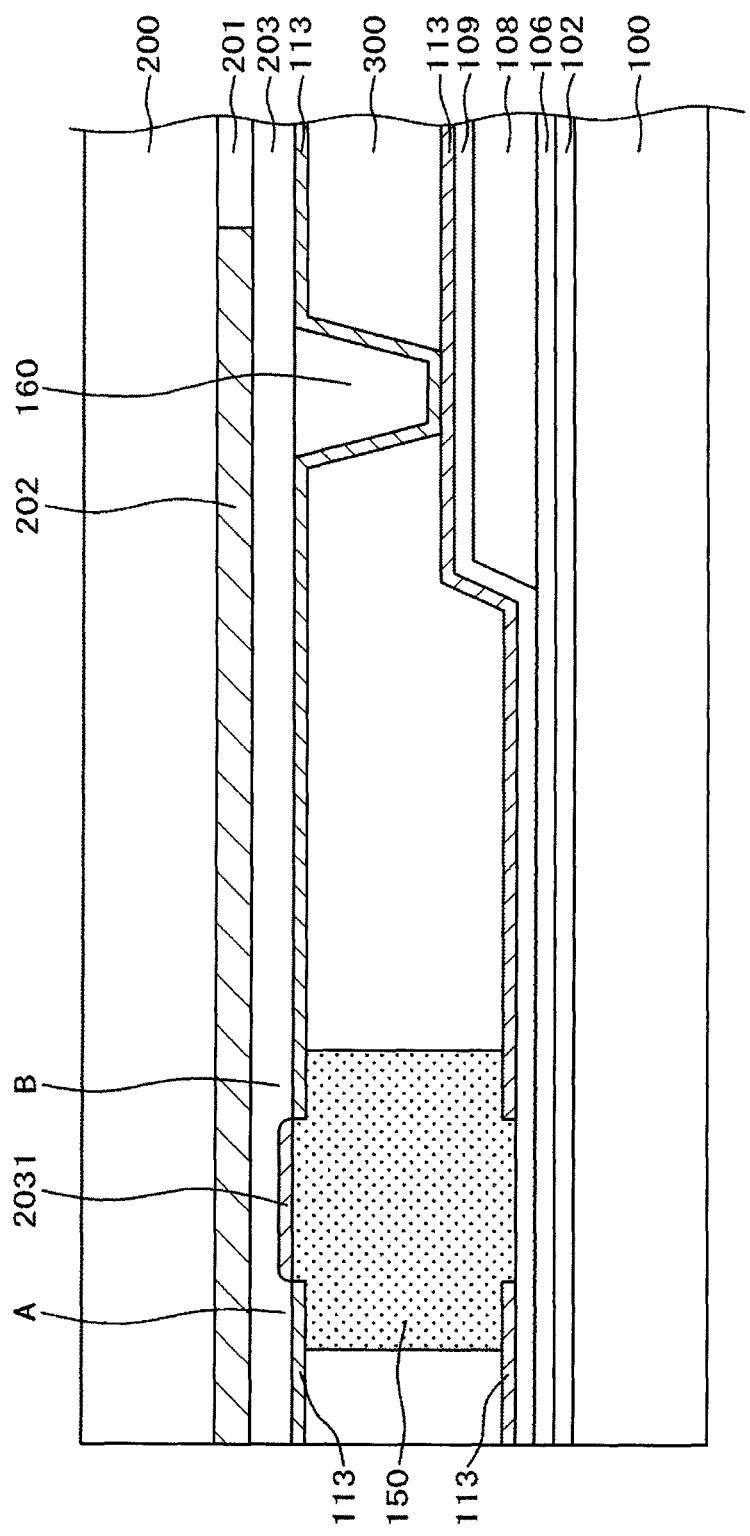
FIG. 6 is a cross sectional view for a seal portion according to a second embodiment of Example 3.

FIG. 6 is a cross sectional view showing a second embodiment of this example. In FIG. 6, the structure on the side of the counter substrate 200 is identical with that in FIG. 4 according to the second embodiment of Example 2. Accordingly, the function on the side of the counter substrate 200 is identical with that described in the second embodiment of Example 2. In contrast, the range over which the alignment film 113 extends on the side of the TFT substrate 100 in FIG. 6 is identical with the range over which the alignment film 113 extends on the side of the counter substrate 200.

On the side of the counter substrate 200 in FIG. 6, intrusion of the moisture from the outside is blocked at a portion where the alignment film 113 overlaps the overcoat film 203, that is, at the portion A and the portion B in the seal portion. Further, the bonding strength between the counter substrate 200 and the sealant 150 is ensured at the portion where the sealant 150 and the overcoat film 203 are in direct contact with each other. On the side of the TFT substrate 100 in FIG. 6, the bonding strength is ensured at a portion where the sealant 150 and the interlayer insulating film 109 formed of SiN are in direct contact with each other.

As described above, in any of the embodiments of this example, intrusion of the moisture into the liquid crystal display panel can be prevented and the strength against mechanical vibrations, or the like can be ensured.

Figure 8:
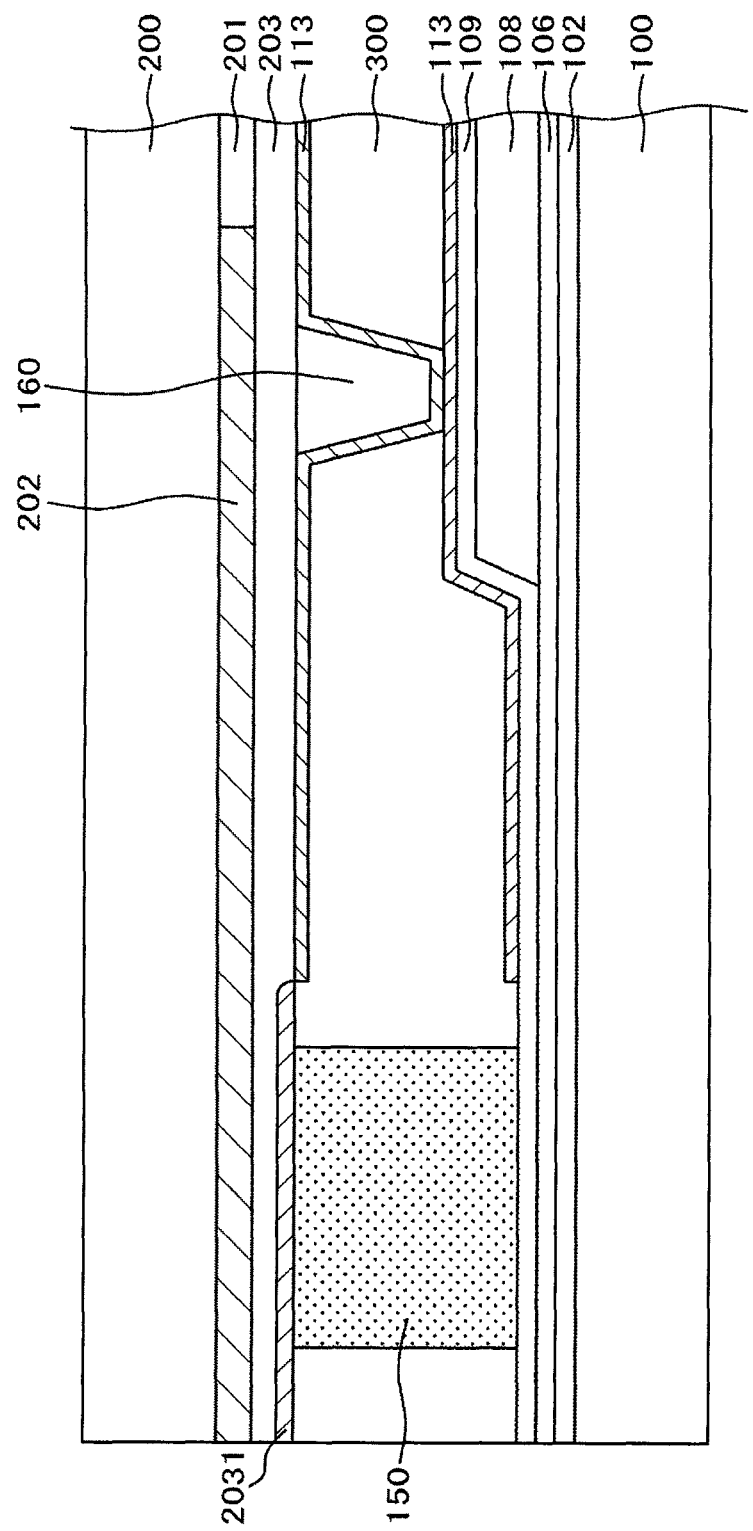
FIG. 8 is a cross sectional view for a seal portion according to Comparative Example 1.
Figure 9:
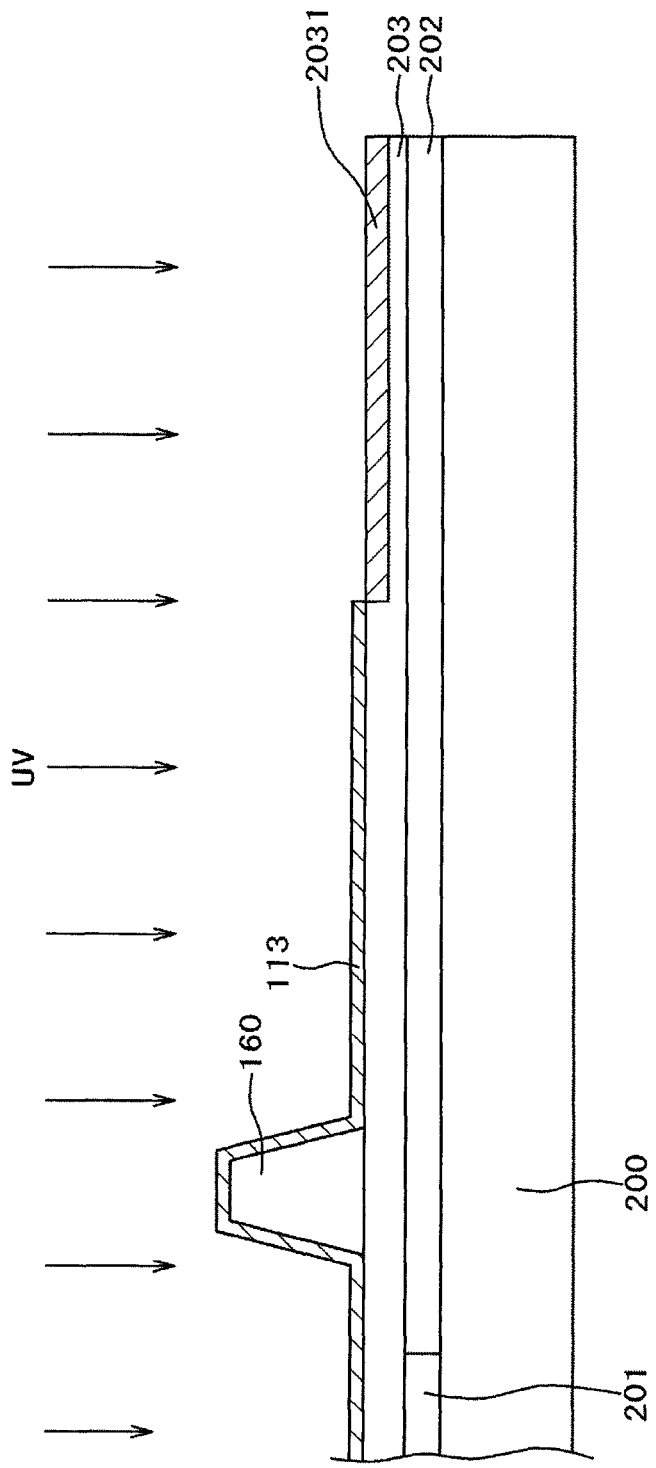
FIG. 9 is a cross sectional view of an counter substrate that is subjected to optical alignment.
Figure 10:
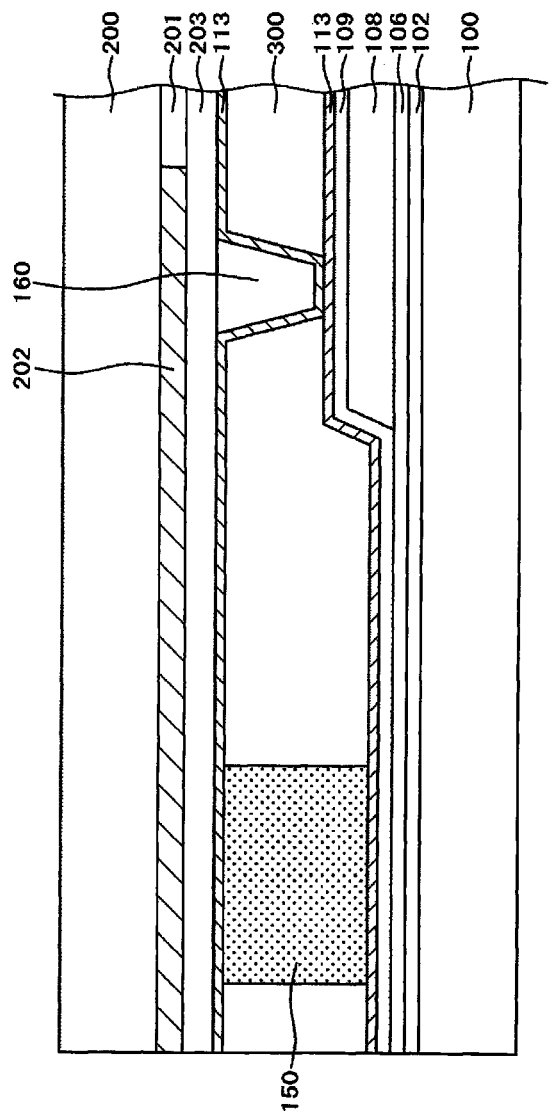
FIG. 10 is a cross sectional view for a seal portion according to Comparative Example 2.
Figure 11:
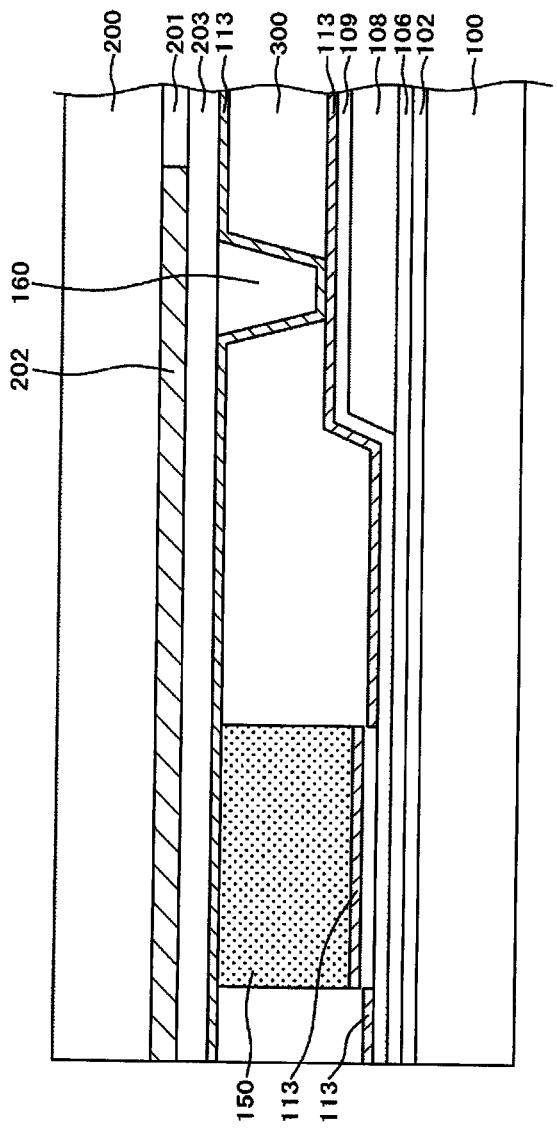
FIG. 11 is a cross sectional view showing a problem in Comparative Example 2.

FIG. 7 is a table showing comparison of structure between each of the examples of the invention described above and the comparative example described in the paragraph for the summary of the invention. The structure shown in FIG. 8 is Comparative Example 1 and the structure shown in FIG. 10 is Comparative Example 2, which have been explained in the summary of the invention. Example 2 in FIG. 7 has a structure shown in FIG. 3 and the Example 3 has a structure shown in FIG. 5.

In FIG. 7, PCT (Pressure Cooker Test) was performed as a test for evaluating the durability against moisture and a vibrational test was performed as a test for evaluating the mechanical strength of the liquid crystal display panel. The PCT test is performed to evaluate failure occurring along with lapse of time (hours) under the circumstances at a temperature of 120° C., at 2 atmospheres, and at a humidity of 100%. The vibrational test is performed to evaluate film peeling occurring when vibrations are applied as impact shocks corresponding to the multiples of the gravitational force, to the liquid crystal display panel by a vibrational tester. In FIG. 7, pass or failure is judged at the measure of 20 hours in the PCT test and 1.5 G for mechanical strength. In the judgment, "o" represents pass and "x" represents failure.

For Comparative Example 1 in FIG. 7, while 2.5 G is ensured for the mechanical strength, the PCT durability is 10 hours and not sufficient. That is, it is considered that moisture intruded through a portion of the overcoat film 203, the portion being deteriorated by the ultraviolet light radiation. In Comparative Example 2, while 50 hours are ensured for the PCT durability, the mechanical strength is 1.5 G which is at a boundary between pass and failure, which is judged to be insufficient. This is considered that the bonding strength between the alignment film 113 and the interlayer insulating film 109 on the side of TFT substrate is not sufficient in the seal portion.

Example 1 ensures 50 hours for the PCT durability, which is within a range of pass. It is considered that the overcoat film 203 is not deteriorated in the structure of Example 1. The mechanical strength is ensured as 2 G, which is within a range of pass. However, the mechanical strength is inferior to other examples. It is considered to be attributable to that the sealant 150 is in contact only with the alignment film 113 on the side of the counter substrate 200.

Example 2 ensures the PCT durability of 50 hours and the mechanical strength of 2.5 G, each of which is within a range of pass. FIG. 3 according to Example 2 shows that moisture from the outside is blocked sufficiently at the portion A where the overcoat film 203, the alignment film 113, and the sealant 150 overlap each other. Further, it shows that the bonding strength of the sealant 150 is ensured sufficiently since the sealant 150 and the overcoat film 203 are in direct contact with each other.

Also Example 3 ensures the PCT durability of 50 hours and the mechanical strength of 2.5 G, each of which is within a range of pass. FIG. 5 according to Example 3 shows that the moisture from the outside is blocked sufficiently at the portion A where the overcoat film 203, the alignment film 113, and the sealant 150 overlap each other. The sealant 150 partially overlaps the alignment film 113 on the side of the TFT substrate 100, which, however, scarcely gives undesired effect on the mechanical strength.

As described above, in the structure of any of Examples 1 to 3, the PCT durability, the mechanical strength, or the like are within a range of pass and the reliability of the liquid crystal display panel can be ensured.

What is claimed is:

1. A liquid crystal display device comprising: a TFT substrate having a pixel electrode and a counter electrode with an inorganic insulating film therebetween, and a first alignment film of organic material formed on part of the inorganic insulating film; a counter substrate having an overcoat film, which is an organic material, formed on a black matrix and color filter, the counter substrate having a second alignment film of organic material formed directly on the overcoat film; and a seal portion including a sealant; wherein the TFT substrate is bonded to the counter substrate by the sealant; wherein the liquid crystal molecules are sandwiched between the TFT substrate and the counter substrate and controlled by an electric field generated between the pixel electrode and the counter electrode of the TFT substrate; wherein the first alignment film is not provided at the seal portion, and the sealant is bonded to the inorganic insulating film of the TFT substrate; wherein, in a cross-section perpendicular to a side of the counter substrate, the sealant is bonded to the second alignment film of the counter substrate at a first part of the seal portion corresponding to an outer side portion including an outer edge of the sealant and at a second part corresponding to an inner side portion of the sealing portion; wherein, in the cross-section perpendicular to the side of the counter substrate, the sealant is bonded to the overcoat film of the counter substrate where the second alignment film is not provided at another part of the seal portion other than the first and second parts of the seal portion; and wherein the first alignment film and the second alignment film of the organic material are responsive to optical alignment for forming anisotropy therein.

2. The liquid crystal display device according to claim 1, wherein the first alignment film and the second alignment film are responsive to irradiation of UV light for the optical alignment.

3. A liquid crystal display device comprising:
a TFT substrate having a pixel electrode and a counter electrode with an inorganic insulating film therebetween, and a first alignment film of organic material formed on part of the inorganic insulating film;
a counter substrate having an overcoat film, which is an organic material formed on a black matrix and color filter, the counter substrate having a second alignment film of organic material formed directly on the overcoat film; and
a seal portion including a sealant;
wherein the TFT substrate is bonded to the counter substrate by the sealant;
wherein liquid crystal molecules are sandwiched between the TFT substrate and the counter substrate and controlled by an electric field generated between the pixel electrode and the counter electrode of the TFT substrate;
wherein, in a cross-section perpendicular to a side of the second substrate, the sealant is bonded to the first alignment film of the TFT substrate at a first part of the seal portion corresponding to an outer side portion of the seal portion and at a second part of the seal portion corresponding to an inner side portion of the seal portion, and the sealant is bonded to the inorganic insulating film of the TFT substrate where the first alignment film is not provided at another part of the seal portion other than the first and second parts of the seal portion;
wherein, in the cross-section perpendicular to the side of the second substrate, the sealant is bonded to the second alignment film of the counter substrate at a third part of the seal portion corresponding to an outer side portion of the seal portion including an outer edge of the sealant and at a fourth part of the seal portion corresponding to an inner side portion of the seal portion;
wherein, in the cross-section perpendicular to the side of the second substrate, the sealant is bonded to the overcoat film of the counter substrate where the second alignment film is not provided at another part of the seal portion other than the third and fourth parts of the seal portion; and
wherein the first alignment film and the second alignment film of the organic material are responsive to optical alignment for forming anisotropy therein.

4. The liquid crystal display device according to claim 3, wherein a pattern of the first alignment film on the TFT substrate is identical with a pattern of the second alignment film on the counter substrate.

* * * * *